United States Patent
Hueber et al.

(10) Patent No.: US 10,680,680 B2
(45) Date of Patent: Jun. 9, 2020

(54) READER-MODE PERFORMANCE ENHANCEMENT FOR INDUCTIVELY COUPLED COMMUNICATION SYSTEMS

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 42 days.

(21) Appl. No.: 15/942,248

(22) Filed: Mar. 30, 2018

(65) Prior Publication Data

US 2019/0305829 A1 Oct. 3, 2019

(51) Int. Cl.
*H04B 17/309* (2015.01)
*H04B 5/02* (2006.01)
*H04B 5/00* (2006.01)
*H04W 52/18* (2009.01)

(52) U.S. Cl.
CPC ............ *H04B 5/02* (2013.01); *H04B 5/0031* (2013.01); *H04B 5/0056* (2013.01); *H04B 5/0075* (2013.01); *H04B 17/309* (2015.01); *H04W 52/18* (2013.01)

(58) Field of Classification Search
CPC ....................................................... H04B 5/02
See application file for complete search history.

(56) References Cited

U.S. PATENT DOCUMENTS

| 9,806,771 | B1 | 10/2017 | Hueber et al. | |
|---|---|---|---|---|
| 2006/0197652 | A1* | 9/2006 | Hild | G06K 7/0008 340/10.2 |
| 2018/0247092 | A1* | 8/2018 | Khojastepour | G06K 7/10079 |
| 2019/0190554 | A1* | 6/2019 | Srinivasan | H04B 1/12 |

* cited by examiner

*Primary Examiner* — Ankur Jain (57) ABSTRACT

This specification discloses methods and systems providing reader-mode performance enhancement for operating a device that communicates via inductive coupling. In reader-mode, Tx (transmitter) power of a reader device is maximized even though for some tags, the communication distance is limited by Rx (receiver) sensitivity. Therefore, power is wasted. Even worse, a too highly boosted Tx power demands a high Rx dynamic range and consequently a low Rx sensitivity. In turn, the communication distance may even be degraded by a too highly boosted Tx power. Therefore, in some embodiments, reader-mode performance enhancement is based on backing off Tx (transmitter) power when not needed (energy distance>communication distance) to save power and/or to relax reader-mode Rx (receiver) sensitivity requirements. In some embodiments, the backing off of Tx (transmitter) is also based on a sensor determining a geometric position/location of a reader device relative to a tag-mode device.

20 Claims, 5 Drawing Sheets

READER-MODE PERFORMANCE ENHANCEMENT FOR INDUCTIVELY COUPLED COMMUNICATION SYSTEMS

FIELD

The described embodiments relate generally to methods and systems for operating a communications device that communicates via inductive coupling, and more particularly to methods and systems with reader-mode performance enhancement for operating a communications device that communicates via inductive coupling.

BACKGROUND

An NFC (Near Field Communication) device is an example of a communications device that communicates via inductive coupling. NFC is a short-range wireless technology that allows communication between NFC enabled objects over a distance of less than 10 cm. NFC is based on Radio Frequency Identification (RFID) standards. It is a technology that is designed to make an easier and more convenient world for us, enhancing the way we make transactions, exchange content and connect devices. The NFC tags one might see or create include contacts, URLs, map locations, text and much more.

An "NFC Device" in reader mode behaves like a simple contactless card reader. It initiates communication by generating a magnetic field and then sending a command to the target. The target responds to the interrogator by retro-reflecting the incident wave. The specificity of NFC operating modes is that the target can be not only a tag or a contactless card, but also an "NFC Device" that behaves like a contactless card (in card emulation mode). Usages of reader mode, for example, include information reading, when "NFC Devices" is used to read data by waving it in front of electronic labels available on streets, bus stops, sightseeing monuments, ad banners, parcels, products or on business cards (vCard). But there are many other possible use cases.

Because an "NFC Device" is very useful, there are strong motivations for enhancing its performance.

SUMMARY

The present specification discloses methods and systems that provide reader-mode performance enhancement for operating a communications device that communicates via inductive coupling. In reader-mode, the Tx (transmitter) power of the reader device is maximized even though for some tag devices, the communication distance is limited by the Rx (receiver) sensitivity. Therefore, power is wasted. Even worse, a too highly boosted Tx power demands a high Rx dynamic range and consequently a low Rx sensitivity. In turn, the communication distance may even be degraded by a too highly boosted Tx power. Therefore, in some embodiments, the reader-mode performance enhancement is based on backing off Tx (transmitter) power when not needed (energy distance>communication distance) to save power and/or to relax reader-mode Rx (receiver) sensitivity requirements. In some embodiments, backing off Tx (transmitter) power also results in a higher signal quality for the received signal from the tag device. In some embodiments, the backing-off of Tx (transmitter) is also based on a sensor determining a geometric position/location of a reader device relative to a tag-mode device.

The present invention provides for a method for operating a reader device that communicates via inductive coupling, the method comprising: (a) generating, by a transmitter unit of the reader device, a transmitted field; (b) receiving, by a receiver unit of the reader device, a response from a tag device, wherein the tag device responds using load modulation on the transmitted field; (c) detecting, by a sensing unit of the reader device, the response from the tag device, wherein detecting the response from the tag device indicates that the response can be demodulated, wherein the sensing unit further determines a signal quality information associated with the response from the tag device; (d) controlling, by a transmitter control unit of the reader device, a strength of the transmitted field based on the signal quality information.

In some embodiments, the strength of the transmitted field is reduced if the signal quality information indicates that the response from the tag device can be demodulated even with the reduced strength of the transmitted field.

In some embodiments, the reduced strength of the transmitted field results in an increase in a signal quality value for the response from the tag device.

In some embodiments, the signal quality information is determined by the sensing unit using one or more of the following: reader demodulator output, reader bit correlator output, reader Rx (receiver) noise estimator, SNR (signal-to-noise ratio) estimation.

In some embodiments, the method further comprising: determining, by a sensor, a geometric position of the reader device relative to the tag device; further controlling, by the transmitter control unit of the reader device, the strength of the transmitted field based on the geometric position of the reader device relative to the tag device.

In some embodiments, the strength of the transmitted field is reduced if the geometric position of the reader device relative to the tag device indicates that the response from the tag device can be demodulated even with the reduced strength of the transmitted field.

In some embodiments, the sensor is selected from one or more of the following: camera sensor, laser sensor, infrared sensor, light sensor, acoustic sensor, ultrasonic sensor, audio sensor, accelerometer sensor, and gyro sensor.

In some embodiments, the transmitter control unit of the reader device controls the strength of the transmitted field using one or more of the following: controlling the Tx (transmitter) output power, controlling the Tx (transmitter) output voltage, controlling the Tx (transmitter) output current, tuning a matching network.

In some embodiments, tuning a matching network comprises: controlling an impedance, controlling a resonant frequency, controlling a quality factor.

In some embodiments, the detecting by the sensing unit of the reader device is performed on one expected response.

In some embodiments, the one expected response is a first expected response.

In some embodiments, the controlling by the transmitter control unit of the reader device is performed for a subsequent message during an ongoing transaction, wherein the subsequent message is one of a plurality of command and response messages.

In some embodiments, the controlling by the transmitter control unit of the reader device is performed for a retransmission of an activation command.

The present invention also provides for a reader device that communicates via inductive coupling, the device comprising: (a) a transmitter unit, the transmitter unit configured to generate a transmitted field; (b) a receiver unit, the receiver unit configured to receive a response from a tag device, wherein the tag device responds using load modulation on the transmitted field; (c) a sensing unit, the sensing unit configured to detect the response from the tag device, wherein detecting the response from the tag device indicates that the response can be demodulated, wherein the sensing unit is further configured to determine a signal quality information associated with the response from the tag device; (d) a transmitter control unit, the transmitter control unit configured to control a strength of the transmitted field based on the signal quality information.

In some embodiments for a reader device, the strength of the transmitted field is reduced if the signal quality information indicates that the response from the tag device can be demodulated even with the reduced strength of the transmitted field.

In some embodiments for a reader device, the reduced strength of the transmitted field results in an increase in a signal quality value for the response from the tag device.

In some embodiments for a reader device, the signal quality information is determined by the sensing unit using one or more of the following: reader demodulator output, reader bit correlator output, reader Rx (receiver) noise estimator, SNR (signal-to-noise ratio) estimation.

In some embodiments for a reader device, a sensor is configured to determine a geometric position of the reader device relative to the tag device, wherein the transmitter control unit is further configured to control the strength of the transmitted field based on the geometric position of the reader device relative to the tag device.

In some embodiments for a reader device, the strength of the transmitted field is reduced if the geometric position of the reader device relative to the tag device indicates that the response from the tag device can be demodulated even with the reduced strength of the transmitted field.

The present invention provides for a computer program product comprising executable instructions encoded in a non-transitory computer readable medium which, when executed by a reader device that communicates via inductive coupling, carry out or control the following method for operating a reader device that communicates via inductive coupling, the method comprising: (a) generating, by a transmitter unit of the reader device, a transmitted field; (b) receiving, by a receiver unit of the reader device, a response from a tag device, wherein the tag device responds using load modulation on the transmitted field; (c) detecting, by a sensing unit of the reader device, the response from the tag device, wherein detecting the response from the tag device indicates that the response can be demodulated, wherein the sensing unit further determines a signal quality information associated with the response from the tag device; (d) controlling, by a transmitter control unit of the reader device, a strength of the transmitted field based on the signal quality information.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

In reader-mode, the Tx (transmitter) power of the reader device is maximized even though for some tag devices, the communication distance is limited by the Rx (receiver) sensitivity. Therefore, power is wasted. Even worse, a too highly boosted Tx power demands a high Rx dynamic range and consequently a low Rx sensitivity. In turn, the communication distance may even be degraded by a too highly boosted Tx power. Therefore, this invention is about reader-mode enhancement to back off Tx (transmitter) power, when not needed (energy distance>communication distance), to save power and/or to relax RM (reader-mode) Rx (receiver) sensitivity requirements. The latter point (i.e., to relax RM Rx sensitivity requirements) is due to Rx signal dynamic range being determined by Tx signal strength, and the received tag response amplitude. The dynamic range is determined by the HW (hardware) IC (integrated circuit) bounds of maximum VRX (receiver voltage) voltage range and the Rx sensitivity. As an example, improvement of up to 3 dB Tx power saving for a reader device can be expected without impact on the communication distance. Improvement of greater than 3 dB Tx power consumption saving can be expected when the actual distance (between the reader device and the tag device) is below the communication distance. Improvement of up to 3 dB Rx sensitivity can also be expected.

In general, this invention uses the detection of the received signal quality (i.e., SNR or equivalent) and control of the Tx (Tx output power, RF front-end control, etc.) in case the SNR (signal-to-noise ratio) is too weak. The received signal is a response from a tag device. Detection of the received signal quality (i.e., SNR or equivalent) can be done using a sensing unit included in a reader device. The sensing unit can detect the received signal quality (i.e., SNR or equivalent) using one of the following techniques: (1) reader demodulator output, (2) reader bit correlator output, (3) reader Rx noise estimator, and (4) SNR estimation. Control of the Tx can be done using a transmitter control unit included in a reader device. The transmitter control unit can control the strength of the transmitted field by controlling the Tx output power, voltage, and/or current. The transmitter control unit can also control the Tx output power by tuning the matching network (e.g., control impedance, resonant frequency, quality factor, etc.).

Figure 1:
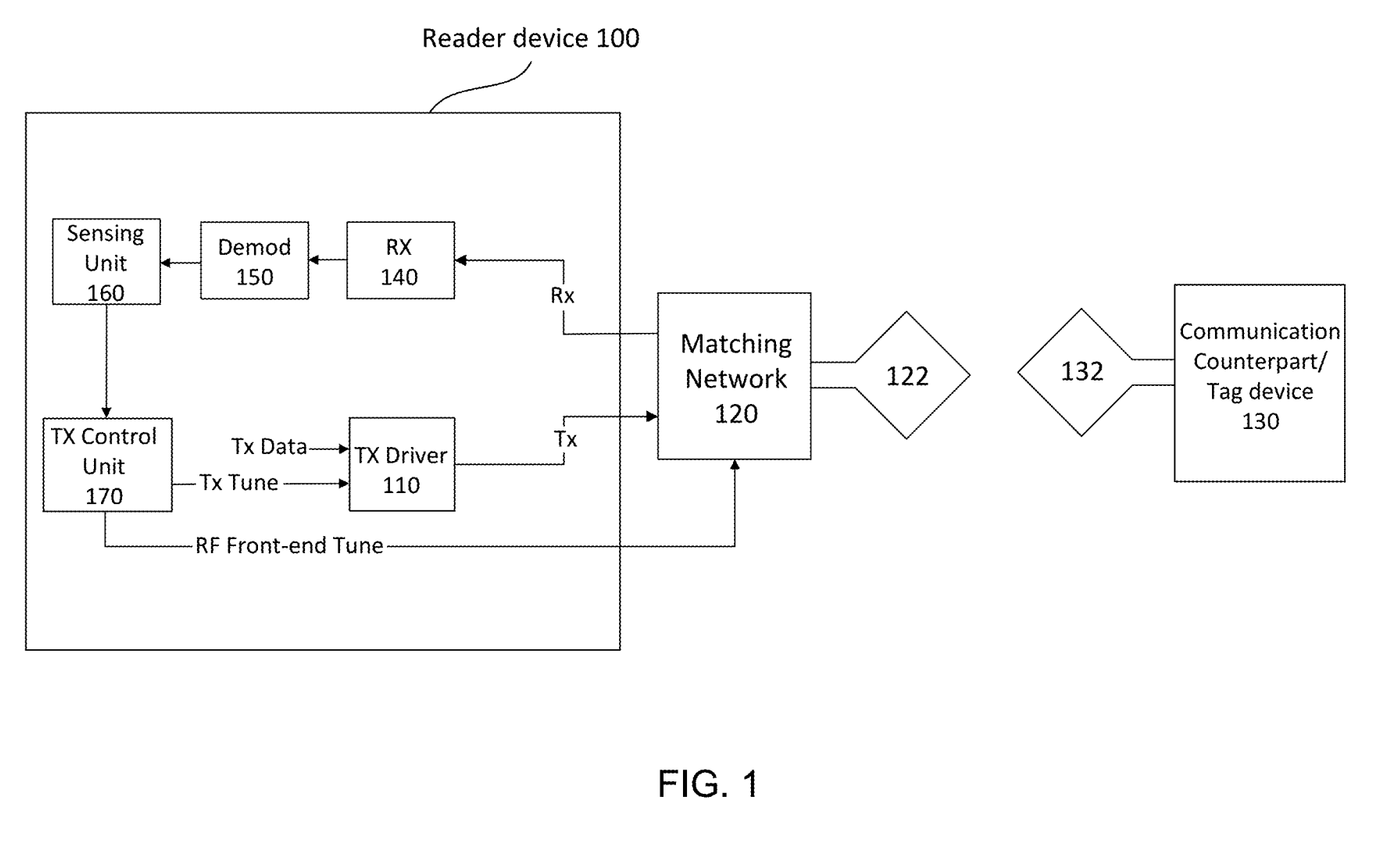
FIG. 1 shows a functional block diagram of a reader device and a tag (card) device in accordance with an embodiment of the invention.

FIG. 1 shows a functional block diagram of a reader device 100 and a tag (card) device 130 (communication counterpart) in accordance with an embodiment of the invention. The reader device 100 is built of the Rx path (including attenuator, gain control, mixer, baseband amplifier, ADCs (analog-to-digital converters)), a demodulator 150, and a sensing unit 160. FIG. 1 shows that the Rx path goes through Rx 140. The reader device 100 also includes the transmit path (where only the Tx driver 110 is shown) and a Tx control unit 170.

Furthermore, FIG. 1 shows there is an antenna and the matching network in between. Antenna 122 and matching network 120 are associated with reader device 100. Antenna 132 is associated with tag device 130.

The novel parts here are the sensing unit 160 and the Tx control unit 170. The sensing unit 160 detects the signal strength of the received signal (which is actually the response from the tag device 130) as represented by a SNR (signal-to-noise ratio). The Tx control unit 170, in turn, adapts the transmit related elements by adjusting the output voltage, strength, etc., and/or by tuning the matching network. FIG. 1 shows that the Tx control unit 170 adjusts the output voltage, strength, power, current, etc. through the Tx tune. FIG. 1 also shows that the Tx control unit 170 tunes the matching network 120 through the RF (radio frequency) front-end tune.

In general, the transmitter unit of the reader device generates a transmitted field. In FIG. 1, Tx driver 110 of the reader device 100 can generate via the matching network 120 a field, which is transmitted by antenna 122. A tag device 130 receives the transmitted field via antenna 132. The tag device 130 responds using load modulation on the transmitted field. The response from the tag device 130 is then received by Rx (receiver) 140 of the reader device 100, via antenna 122 and matching network 120. In general, a receiver unit of the reader device receives a response from a tag device.

After passing through the demodulator 150, a sensing unit 160 of the reader device 100 can detect the response from the tag device. The sensing unit 160 can detect a tag device 130 is transmitting a response. The sensing unit 160 can further detect that a response from the tag device 130 can be demodulated. The sensing unit 160 can still further determine a signal strength of the received signal (i.e., the response from the tag) as represented by a signal quality or SNR (signal-to-noise ratio). Therefore, in general, the sensing unit 160 can further determine a signal quality or a SNR (signal-to-noise ratio) information associated with the response from the tag device 130.

In some embodiments, the sensing unit 160 may additionally assess the static or dynamic geometric position/location of a reader device relative to a tag-mode device. In that case, a sensor (which can be a part of the sensing unit 160) would additionally assess the static or dynamic geometric position/location of a reader device relative to a tag-mode device, and then pass the geometric position/location information to the Tx control unit 170. This can be easily implemented using the embodiment shown in FIG. 1, because the sensing unit 160 is directly connected to the Tx control unit 170 in FIG. 1, so the sensing unit 160 can simply transmit directly the geometric position/location information to the Tx control unit 170. However, in some embodiments, the sensor may not a part of the sensing unit 160, so then the sensor would somehow need to transmit the geometric position/location information to the Tx control unit 170. This is not shown in FIG. 1, but that can be accomplished either: (1) by having the sensor transmit the geometric position/location information directly to the Tx control unit 170, or (2) by having the sensor first transmit the geometric position/location information to the sensing unit 160, and then having the sensing unit 160 further transmit the geometric position/location information to the Tx control unit 170.

In some embodiments, a sensor used to assess the static or dynamic geometric position/location of a reader device relative to a tag-mode device can be selected from one or more of the following: camera sensor, laser sensor, infrared sensor, light sensor, acoustic sensor, ultrasonic sensor, audio sensor, accelerometer sensor, gyro sensor, etc.

In some embodiments, a geometric position/location of a reader device relative to a tag device can be a distance information of a reader device relative to a tag device. In some embodiments, the distance information can be one of the following: (1) a floating point or integer representation of a distance in, for example, mm, cm, etc. of a scaled value (Note: the value can be quasi continuous, monotonic, but not necessarily linear), (2) a rounding, scaling, linear or nonlinear function of a distance, (3) a discrete representation of distance. For a discrete representation of distance: it can be, for example, a binary indicator if distance is low or high (based on a threshold); or, it can be, for example, an indicator based on segments (like an enumeration). The distance segments can be like low, mid, high distance (based on respective thresholds), but there could be more segments.

In some embodiments, a geometric position/location of a reader device relative to a tag device can be a geometric information of a reader device relative to a tag device. In some embodiments, the geometric information can be a geometric measurement or a geometric parameter between a reader device and a tag device. In some embodiments, the geometric information can include distance, shift, offset, rotation, etc. (actually, the x/y/z including rotation vector alpha/beta/gamma) and their derivatives (speed).

In some embodiments, the geometric information can be determined using a sensor. In some embodiments, the sensor used can be a gyroscope (there will be specific orientation used during a transaction). In some embodiments, the sensor used can detect speed of movement. In some embodiments, speed will need to be low during a transaction.

In general, the transmitter control unit 170 of the reader device 100 receives the signal quality or SNR (signal-to-noise ratio) information (that is associated with the response from the tag device 130) from the sensing unit 160. Based on the signal quality or SNR (signal-to-noise ratio) information from the sensing unit 160, the transmitter control unit 170 controls a strength of the transmitted field. In some embodiments, the strength of the transmitted field is reduced if the signal quality or SNR information indicates that the response from the tag device can be demodulated even with the reduced strength of the transmitted field. In some embodiments, the reduced strength of the transmitted field results in an increase in a signal quality or SNR (signal-to-noise ratio) value for the response from the tag device. This is because the backed-off Tx will cause the Rx HF (high frequency) attenuator to increase gain. Then, although the Tx leakage is ending at the same (initial) level, the received signal from the tag device will show less attenuation as well. Hence, effectively, the input Rx sensitivity is relaxed.

In some embodiments, the transmitter control unit 170 of the reader device 100 may receive additional geometric position/location information from the sensing unit 160 (and/or a sensor, which can be a part of or not a part of the sensing unit 160). Based on the additional geometric position/location information from the sensing unit 160 (and/or the sensor), the transmitter control unit 170 further controls a strength of the transmitted field. In some embodiments, the strength of the transmitted field is reduced if the signal quality or SNR information indicates that the response from the tag device can be demodulated even with the reduced strength of the transmitted field. In some embodiments, the reduced strength of the transmitted field results in an increase in a signal quality or SNR (signal-to-noise ratio) value for the response from the tag device. This is because the backed-off Tx will cause the Rx HF (high frequency) attenuator to increase gain. Then, although the Tx leakage is ending at the same (initial) level, the received signal from the tag device will show less attenuation as well. Hence, effectively, the input Rx sensitivity is relaxed.

In general, detection of the received signal quality or SNR (or equivalent) can be achieved using a sensing unit included in a reader device. The sensing unit can detect the received signal SNR (or equivalent) using one of the following techniques: (1) reader demodulator output, (2) reader bit correlator output, (3) reader Rx noise estimator, (4) SNR estimation. Further, the sensing unit can detect that the response from the tag device can be demodulated based on demodulator output. Control of the strength of the transmitted field can be achieved using a transmitter control unit (such as Tx control unit 170) included in a reader device.

The transmitter control unit can control the transmitted field strength based on sensor information from the sensing unit using one or more of the following techniques: (1) controlling the Tx (transmitter) output power, voltage, and/or current, (2) tuning the matching network, (3) other means. Furthermore, tuning a matching network can include: (1) controlling an impedance, (2) controlling a resonant frequency, (3) controlling a quality factor, (4) other means.

In some embodiments, the sensing and detecting by a sensing unit (such as sensing unit 160) of a reader device is performed on one expected response from a tag device (such as tag device 130). In some embodiments, the sensing and detecting by a sensing unit (such as sensing unit 160) of a reader device is performed on a first expected response from a tag device (such as tag device 130).

In some embodiments, controlling of the strength of the transmitted field by a transmitter control unit (such as Tx control unit 170) of a reader device can be performed for a subsequent message (of command and response messages) in the course of an ongoing transaction or for a retransmission of the activation command. In some embodiments, controlling of the strength of the transmitted field by a transmitter control unit of a reader device can be performed for a subsequent message during an ongoing transaction, wherein the subsequent message is one of a series of command and response messages. In some embodiments, controlling of the strength of the transmitted field by a transmitter control unit of a reader device can be performed for a retransmission of an activation command.

Figure 2:
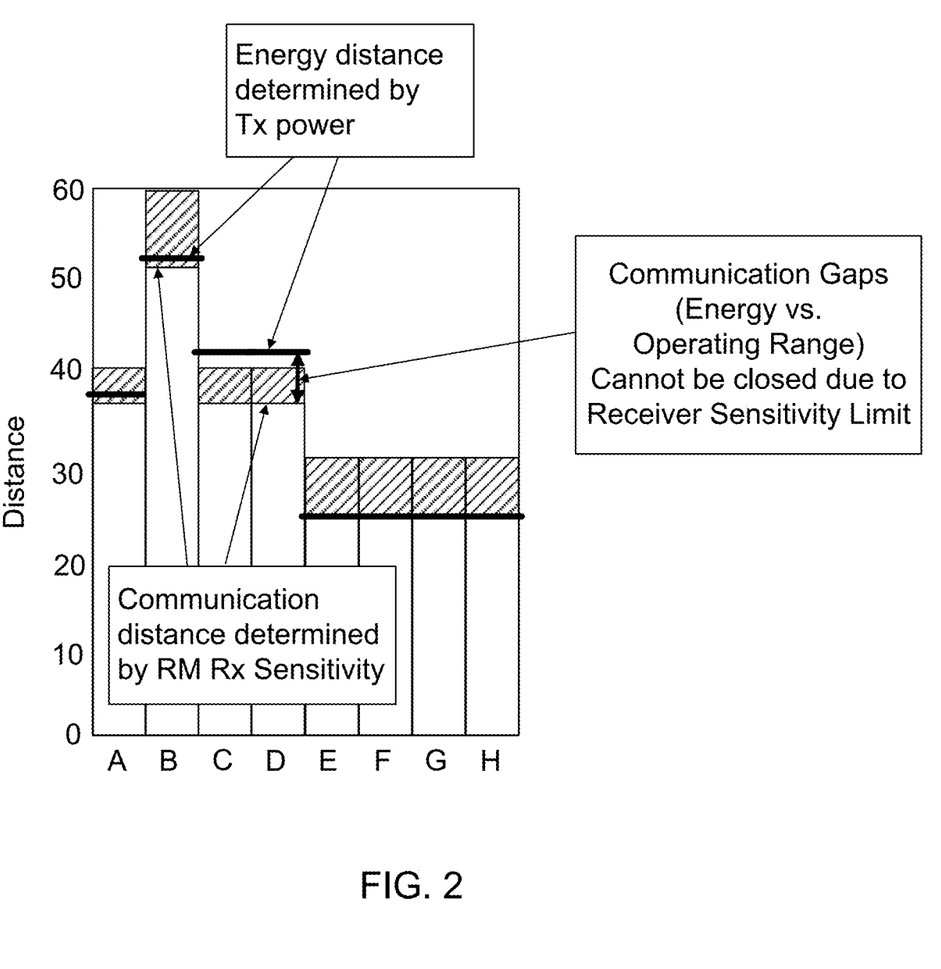
FIG. 2 shows a summary (and example) for gap of communication vs. energy distance for an example reader device in accordance with some embodiments of the invention.

FIG. 2 shows a summary (and example) for gap of communication vs. energy distance for an example reader device in accordance with some embodiments of the invention. FIG. 2 shows the energy distance and communication distance for a number of use case examples labelled A, B, C, D, E, F, G, and H. The distance is measured between a tag device and a reader device. An energy distance for a reader device is typically determined by a Tx (transmitter) power, while a communication distance is typically determined by a RM (reader-mode) Rx (receiver) sensitivity. For use case example D, the energy distance of 42 units is significantly higher than the communication distance of 37 units. This means that, for use case example D, the Tx (transmitter) power is boosted such that the tag device is able to respond up to 42 units away from the reader device, regardless of the communication failing above 37 units due to sensitivity limitations. Because the energy distance is significantly higher than the communication distance, there is a communication gap (energy vs. operating range), which cannot be closed due to the Rx (receiver) sensitivity limit. As a different example, for use case example B, the energy distance of 52 units is higher than the communication distance of 51 units, but not significantly higher. This means that, for use case example B, the Tx (transmitter) power is boosted such that the tag device is able to respond up to 52 units away from the reader device, regardless of the communication failing above 51 units due to sensitivity limitations. Here, because the communication gap (energy vs. operating range) is smaller, there is a possibility to reduce the Tx (transmitter) power, so that communication is possible due to an improvement in the signal quality for the response from the tag device based on the reduced Tx (transmitter) power.

As an example, a back-off in Tx power by 3 dB can be sufficient to maintain full communication distance. However, the Tx power back-off of 3 dB saves 500 mW, as referenced to the power at the antenna. Hence, in terms of power at the IC's (integrated circuit's) supply, the saving is expected to be even higher. As another example, when the energy distance is greater than the communication distance, it can be possible to reduce the Tx power by 3 dB, so that consequently the impact of Tx to Rx noise is alleviated by 3 dB. Therefore, in general, a back-off in the TX power saves energy, and will also relax Rx sensitivity needs.

Figure 3:
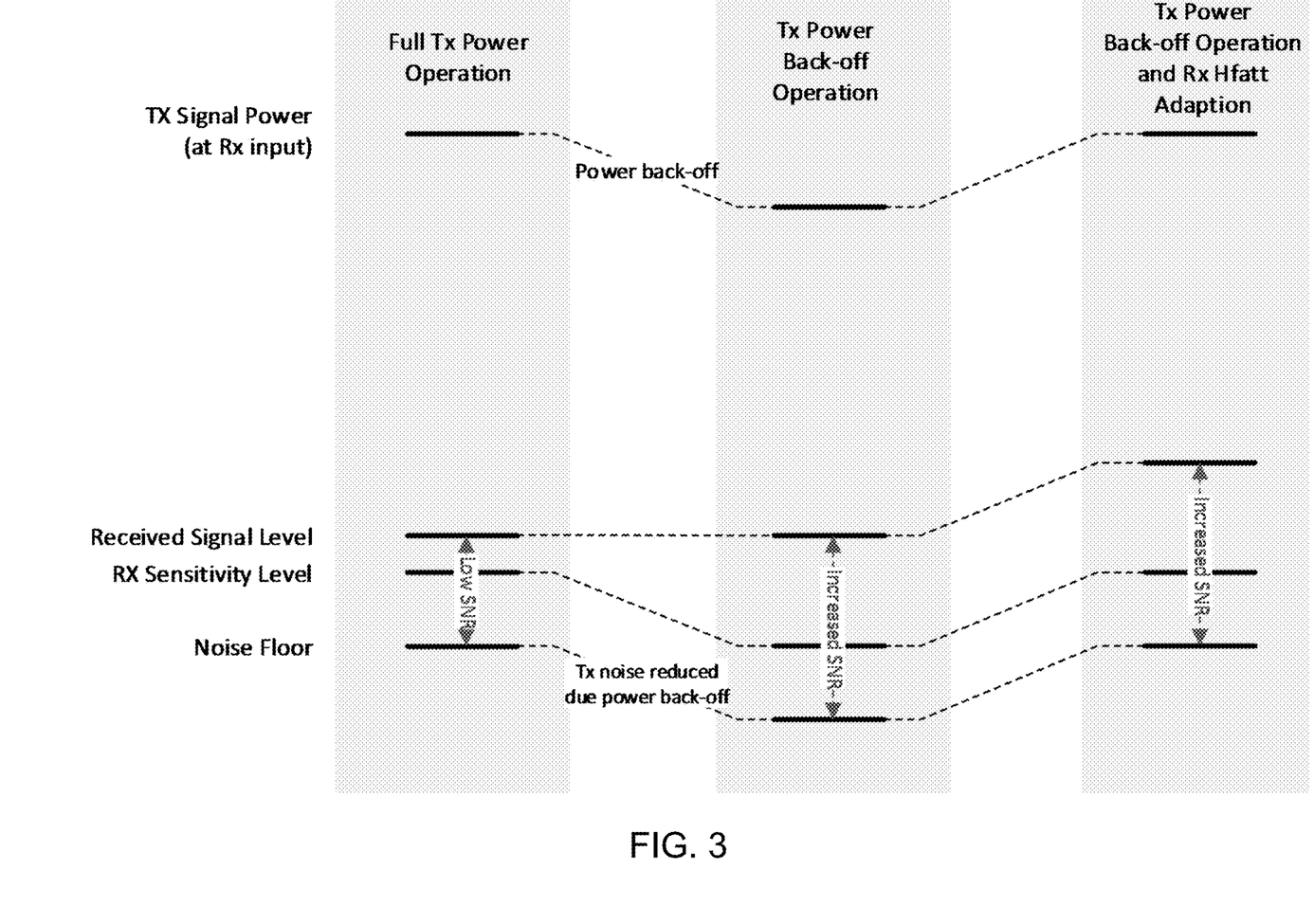
FIG. 3 shows a conceptual Rx (receiver) level plan at Rx (receiver) input for Tx (transmitter) power back-off and HFatt (high frequency attenuator) adaption in accordance with some embodiments of the invention.

FIG. 3 shows a conceptual Rx (receiver) level plan at Rx (receiver) input for Tx (transmitter) power back-off and HFatt (high frequency attenuator) adaption in accordance with some embodiments of the invention. In general, FIG. 3 shows how a reduction in the Tx power can result in an improved Rx signal quality or SNR (signal-to-noise ratio). FIG. 3 shows the changes in these parameters: Tx signal power, the received (Rx) signal level, the Rx sensitivity level, and the noise floor, as a consequence of reducing the Tx power. FIG. 3 first shows these parameters with full Tx power operation. Then FIG. 3 shows these parameters with a Tx power back-off. However, a lower Tx input signal results in an adjustment of the HF (high frequency) attenuation, so FIG. 3 shows these parameters with Tx power back-off operation and Rx HF attenuation adaption.

In FIG. 3, the dominant signal in the RF is the Tx leakage into the Rx, which is the signal that needs to be considered for HF attenuation to ensure that the Rx is not driven beyond its physical limits (due to pads requirements) or saturation of the input. The noise floor is dominated by the Tx leakage as denoted. Consequently, if the Tx signal is backed-off, the noise floor is lowered as well. In turn, the Rx SNR (received signal level vs. noise floor) is increased. In FIG. 3, this is shown (for "Tx power back-off operation") as a reduction in the noise floor and an increase in the SNR. Lastly, upon adjustment of the HF attenuation due to a lower relevant Tx signal power, the input signals (i.e., Tx leakage, wanted received signal, noise) are increased. However, the improved SNR is maintained. Therefore, for "Tx power back-off operation and Rx HFatt adaption", FIG. 3 shows an increased signal quality or SNR.

Figure 4:
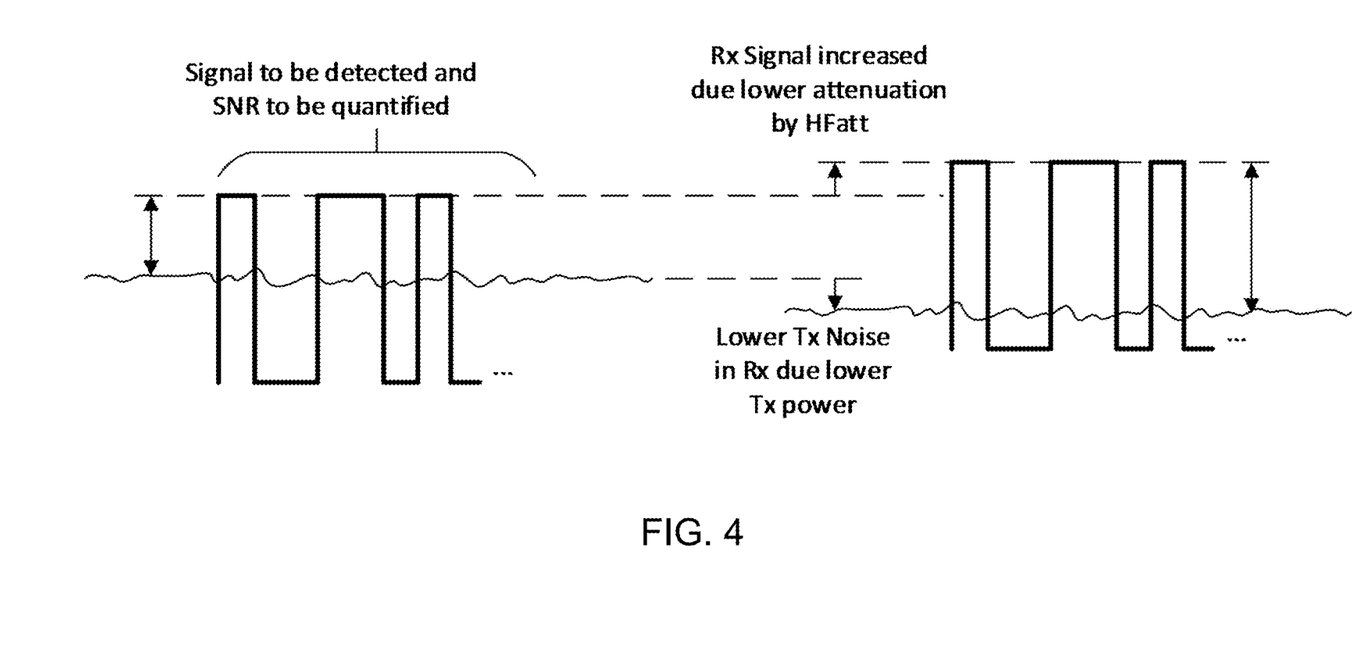
FIG. 4 shows a baseband signal analysis for Tx (transmitter) power back-off and HFatt (high frequency attenuator) adaption in accordance with some embodiments of the invention.

FIG. 4 shows a baseband signal analysis for Tx (transmitter) power back-off and HFatt (high frequency attenuator) adaption in accordance with some embodiments of the invention. FIG. 4 is similar to FIG. 3, except the signals in the baseband are shown. In general, FIG. 4 also shows how a reduction in the Tx power can result in an improved Rx signal quality or SNR (signal-to-noise ratio).

FIG. 4 first shows (on the left-hand side) the baseband signals with full Tx power operation, indicating clearly the signal to be detected and the SNR to be quantified. Then FIG. 4 shows (on the right-hand side) the baseband signals with Tx power back-off operation and Rx HF attenuation adaption. It can be clearly seen in FIG. 4 that the Rx signal is increased due to lower attenuation by HFatt, and that the Tx noise in Rx is lowered due to lower Tx power. The end result is again an increased SNR with Tx power back-off operation and Rx HF attenuation adaption.

Figure 5:
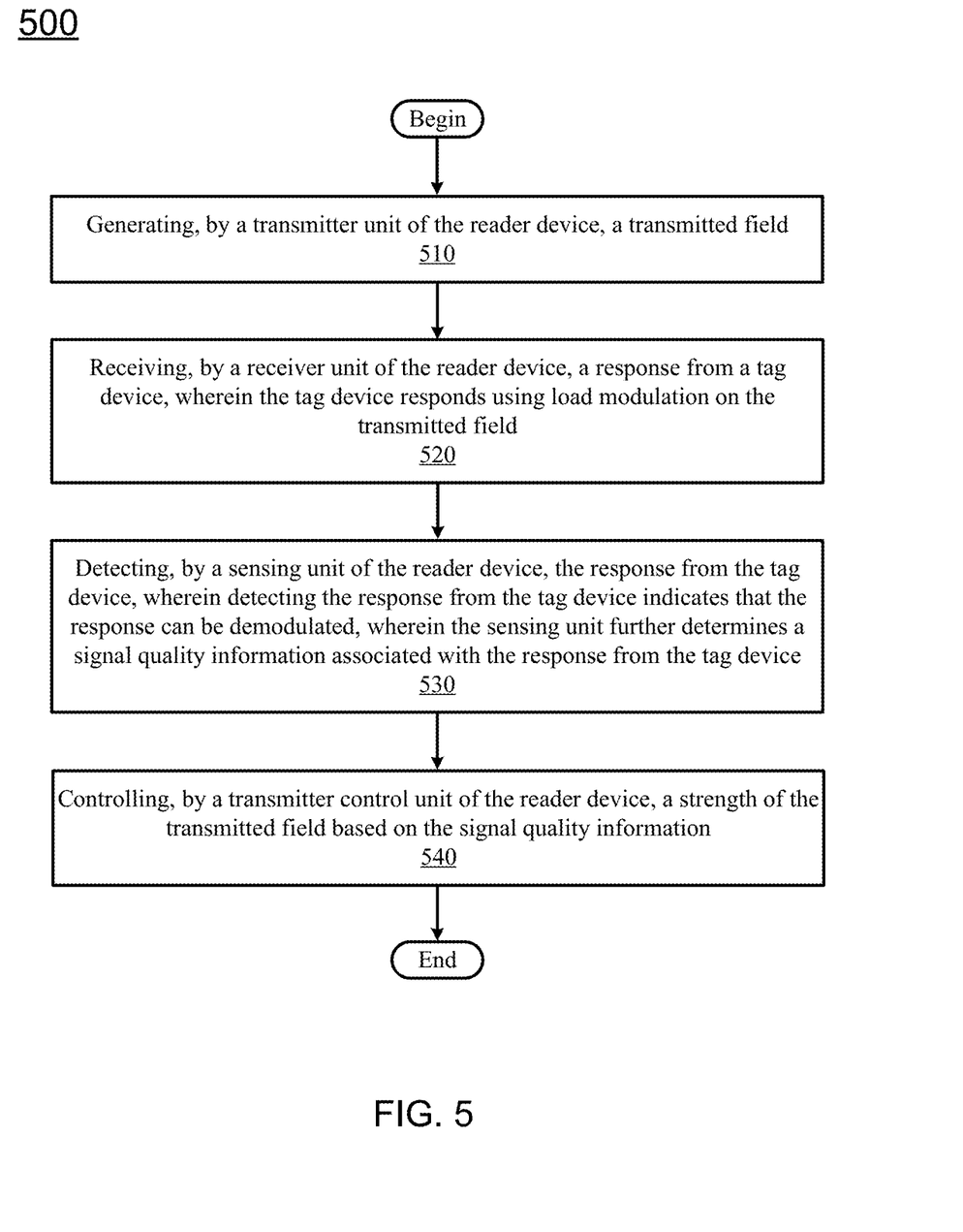
FIG. 5 shows a method for performance enhancement of a reader device by controlling, by a transmitter control unit of the reader device, a strength of the transmitted field based on the received signal quality information in accordance with some embodiments of the invention.

FIG. 5 shows a method for performance enhancement of a reader device by controlling, by a transmitter control unit of the reader device, a strength of the transmitted field based on the received signal quality information in accordance with some embodiments of the invention. As shown in FIG. 5, the method 500 begins at step 510, where the method generates, by a transmitter unit of the reader device, a transmitted field. Then, the method proceeds to step 520. In step 520, the method receives, by a receiver unit of the reader device, a response from a tag device, wherein the tag device responds using load modulation on the transmitted field. Next, at step 530, the method detects, by a sensing unit of the reader device, the response from the tag device, wherein detecting the response from the tag device indicates that the response can be demodulated, wherein the sensing unit further determines a signal quality information associated with the response from the tag device. Finally, at step 540, the method controls, by a transmitter control unit of the reader device, a strength of the transmitted field based on the signal quality information.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for operating a reader device that communicates via inductive coupling, the method comprising:
  generating, by a transmitter unit of the reader device, a transmitted field;
  receiving, by a receiver unit of the reader device, a response from a tag device, wherein the tag device responds using load modulation on the transmitted field;
detecting, by a sensing unit of the reader device, the response from the tag device,
wherein detecting the response from the tag device indicates that the response can be demodulated,
wherein the sensing unit further determines a signal quality information associated with the response from the tag device using a reader bit correlator output and reader receiver noise estimator to provide a signal-to-noise ratio estimation as the signal quality information;
reducing, by a transmitter control unit of the reader device, a strength of the transmitted field based on the signal quality information, wherein in response to the reduced strength of the transmitted field a high frequency (HF) attenuator of the receiver unit will increase a gain.

2. The method of claim 1, wherein the strength of the transmitted field is reduced if the signal quality information indicates that the response from the tag device can be demodulated even with the reduced strength of the transmitted field.

3. The method of claim 2, wherein the reduced strength of the transmitted field results in an increase in a signal quality value for the response from the tag device.

4. The method of claim 1, wherein the signal quality information is determined by the sensing unit from the tag device after the response passes through the reader demodulator.

5. The method of claim 1, further comprising:
determining, by a sensor, a geometric position of the reader device relative to the tag device;
further controlling, by the transmitter control unit of the reader device, the strength of the transmitted field based on the geometric position of the reader device relative to the tag device.

6. The method of claim 5, wherein the strength of the transmitted field is reduced if the geometric position of the reader device relative to the tag device indicates that the response from the tag device can be demodulated even with the reduced strength of the transmitted field.

7. The method of claim 5, wherein the sensor is selected from one or more of the following:
camera sensor,
laser sensor,
infrared sensor,
light sensor,
acoustic sensor,
ultrasonic sensor,
audio sensor,
accelerometer sensor, and
gyro sensor.

8. The method of claim 1, wherein the transmitter control unit of the reader device controls the strength of the transmitted field using one or more of the following:
controlling the Tx (transmitter) output power,
controlling the Tx (transmitter) output voltage,
controlling the Tx (transmitter) output current,
tuning a matching network.

9. The method of claim 8, wherein tuning a matching network comprises:
controlling an impedance,
controlling a resonant frequency,
controlling a quality factor.

10. The method of claim 1, wherein the detecting by the sensing unit of the reader device is performed on one expected response.

11. The method of claim 10, wherein the one expected response is a first expected response.

12. The method of claim 1, wherein the controlling by the transmitter control unit of the reader device is performed for a subsequent message during an ongoing transaction, wherein the subsequent message is one of a plurality of command and response messages.

13. The method of claim 1, wherein the controlling by the transmitter control unit of the reader device is performed for a retransmission of an activation command.

14. A reader device that communicates via inductive coupling, the device comprising:
a transmitter unit, the transmitter unit configured to generate a transmitted field;
a receiver unit, the receiver unit configured to receive a response from a tag device, wherein the tag device responds using load modulation on the transmitted field;
a sensing unit, the sensing unit configured to detect the response from the tag device,
wherein detecting the response from the tag device indicates that the response can be demodulated,
wherein the sensing unit is further configured to determine a signal quality information associated with the response from the tag device using a reader bit correlator output and reader receiver noise estimator to provide a signal-to-noise ratio estimation as the signal quality information;
a transmitter control unit, the transmitter control unit configured to reduce a strength of the transmitted field based on the signal quality information, wherein in response to the reduced strength of the transmitted field a high frequency (HF) attenuator of the receiver unit will increase a gain.

15. The reader device of claim 14, wherein the strength of the transmitted field is reduced if the signal quality information indicates that the response from the tag device can be demodulated even with the reduced strength of the transmitted field.

16. The reader device of claim 15, wherein the reduced strength of the transmitted field results in an increase in a signal quality value for the response from the tag device.

17. The reader device of claim 14, wherein the signal quality information is determined by the sensing unit from the tag device after the response passes through the reader demodulator.

18. The reader device of claim 14,
wherein a sensor is configured to determine a geometric position of the reader device relative to the tag device,
wherein the transmitter control unit is further configured to control the strength of the transmitted field based on the geometric position of the reader device relative to the tag device.

19. The reader device of claim 18, wherein the strength of the transmitted field is reduced if the geometric position of the reader device relative to the tag device indicates that the response from the tag device can be demodulated even with the reduced strength of the transmitted field.

20. A computer program product comprising executable instructions encoded in a non-transitory computer readable medium which, when executed by a reader device that communicates via inductive coupling, carry out or control the method of claim 1.

* * * * *